Oct. 22, 1968
G. IRWIN
3,406,621
CAMERA CONSTRUCTION
Filed June 22, 1965
3 Sheets-Sheet 1
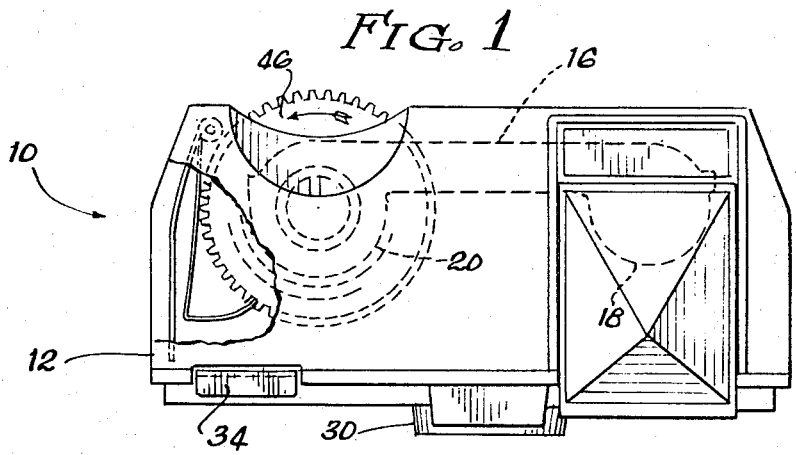
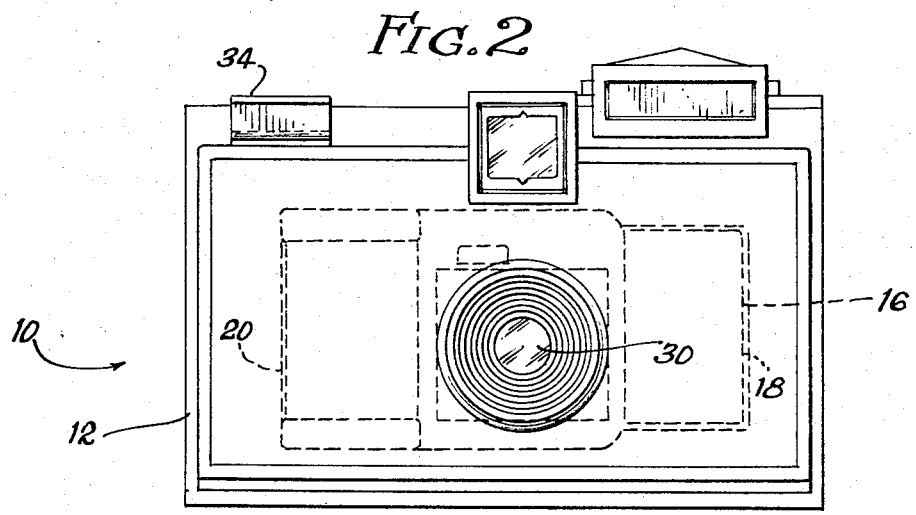
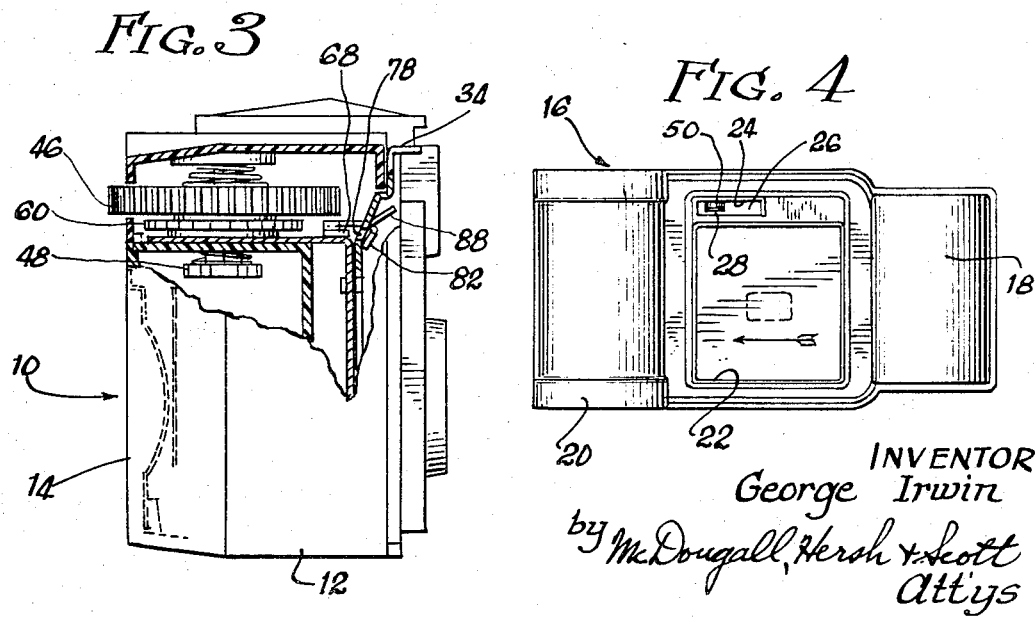
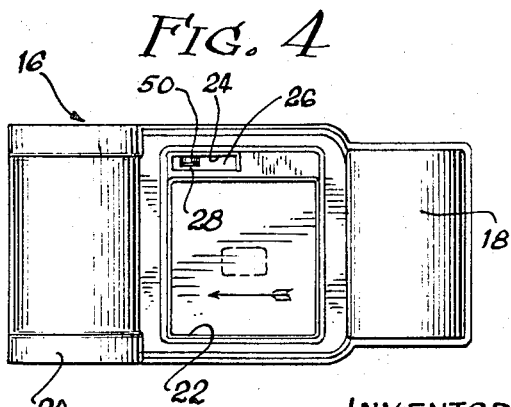
INVENTOR
George Irwin
by McDougall, Hersh & Scott
Att'ys

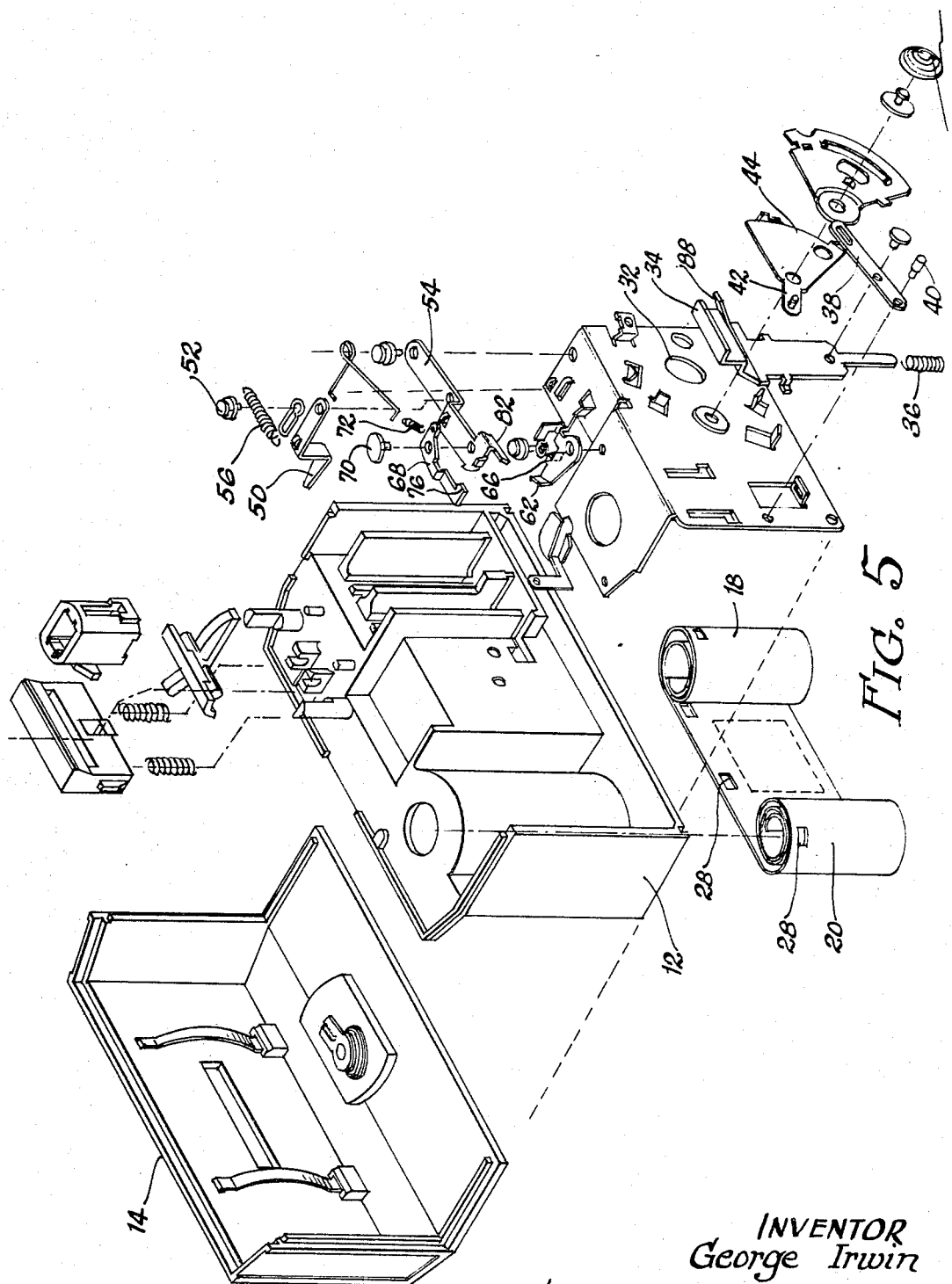

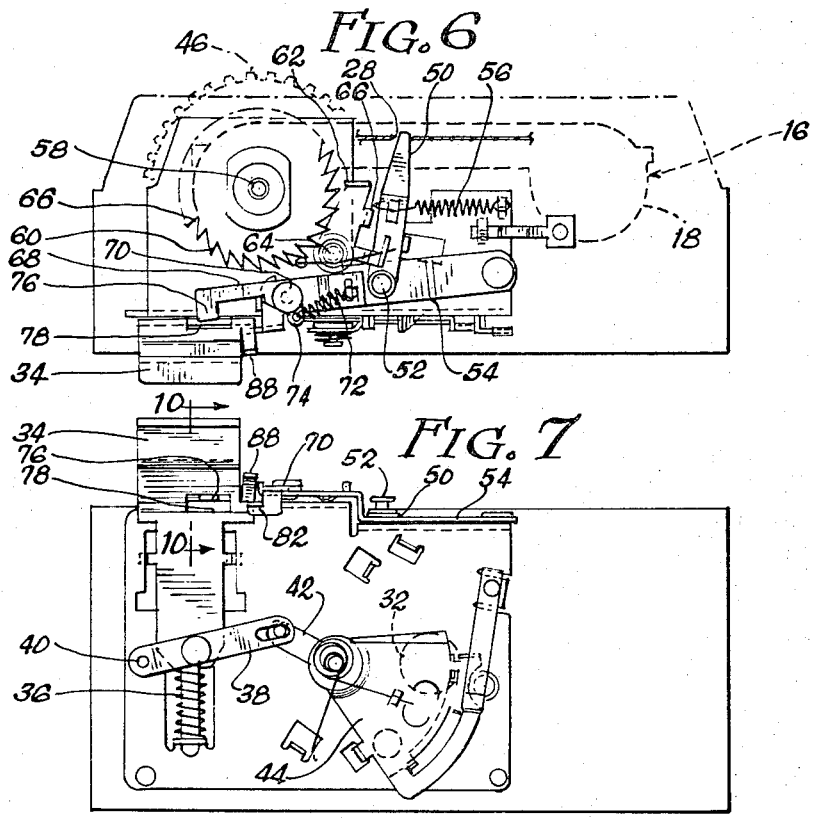
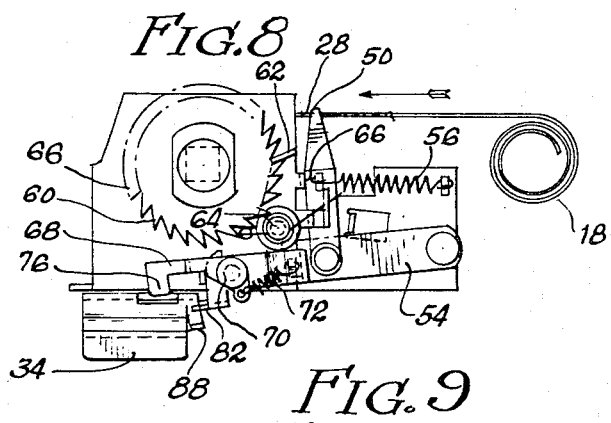
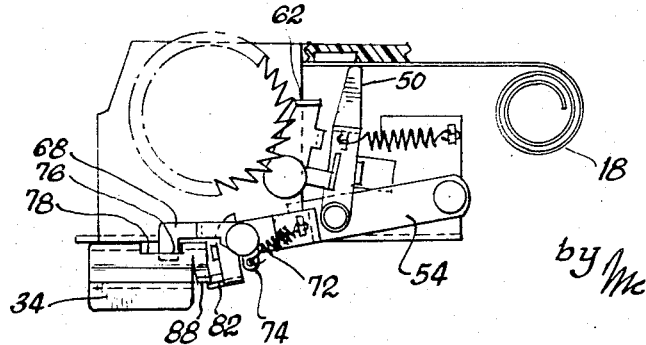

United States Patent Office 3,406,621
Patented Oct. 22, 1968

3,406,621
CAMERA CONSTRUCTION
George Irwin, Highland Park, Ill., assignor to Imperial Camera Corporation, Chicago, Ill., a corporation of Delaware
Filed June 22, 1965, Ser. No. 465,950
5 Claims. (Cl. 95—31)

ABSTRACT OF THE DISCLOSURE

A camera construction for use with film of the type defining a plurality of frames with perforations defined along the length of the film for purposes of indexing the film, frame-by-frame. A sensing member is mounted in the camera housing for engagement with the perforations. Advancing means for the film are operable until the sensing member engages a perforation, at which time the sensing member operates to lock the film advancing means against further movement. Means are provided in association with the sensing means for locking the shutter actuating mechanism until a perforation is engaged whereby the shutter actuating member will only operate when the film is in position. Cam means are formed on the shutter actuating member to remove the sensing means from a perforation while at the same time unlocking the advancing means.

---

This invention relates to an improved camera construction. In particular, the invention is directed to a camera construction which is adapted to be utilized for taking still pictures by means of film which is carried in a cartridge or the like.

Nerwin Patent No. 3,138,081, issued on June 23, 1964 illustrates a construction comprising a roll film magazine wherein a length of film is located within a magazine body. One end of the film is attached to a spool at one side of the magazine while a supply roll of film is located at the other side of the magazine. An opening is defined by the back of the magazine whereby movement of the film will provide for exposure through this opening. When the film is associated with a camera adapted to rotate the spool, the pictures can be taken.

A camera adapted to be used in conjunction with the magazine is disclosed in Harvey Patent No. 3,138,084. This camera is provided with a sensing finger which is adapted to engage the surface of the film in the cartridge. Perforations are defined by the film, and these perforations are spaced at intervals which correspond to a frame of the film. The sensing finger is adapted to successively engage these perforations as the film is moved in the camera. Engagement of a perforation by the sensing means will impede further movement of the film whereby the user of the camera can automatically determine when the film is in a position for taking the next picture. In the Harvey construction, a separate button is provided on the camera for disengaging the sensing finger to permit further movement of the film.

It is a general object of this invention to provide an improved camera construction which is adapted to be used in conjunction with a film magazine.

It is a more particular object of this invention to provide an improved camera construction which includes a sensing member adapted to engage a perforation in roll film to provide for accurate indexing of the film and which also controls other camera operations to prevent improper camera operation.

It is a further object of this invention to provide an arrangement of the type described which combines means for controlling indexing movement of the film in a camera while at the same time providing a latching arrangement for the camera shutter whereby the camera cannot be operated unless the film is in proper position.

These and other objects of this invention will appear hereinafter and for purposes of illustration but not of limitation, specific embodiments of this invention are shown in the accompanying drawings in which:

FIGURE 1 is a top plan view, partly cut away, of a camera construction characterized by the features of this invention;

FIGURE 2 is a front elevation of the camera construction shown in FIGURE 1;

FIGURE 3 is a side elevation, partly cut away, of the camera construction shown in FIGURE 1;

FIGURE 4 is an elevational view of a film cartridge of the type adapted to be utilized in the camera construction of this invention;

FIGURE 5 is an exploded perspective view illustrating the various elements in the camera construction;

FIGURE 6 is a horizontal sectional view of the construction;

FIGURE 7 is a vertical sectional view of the construction;

FIGURE 8 is a detail view illustrating the sensing and latching mechanisms of the construction;

FIGURE 9 is a view corresponding to the view of FIGURE 8 illustrating the sensing and latching mechanisms in a different position of operation; and FIGURE 10 is an enlarged detail view in section illustrating the shutter latching mechanism.

The camera construction of this invention includes various conventional elements including a housing having a lens, a shutter and a shutter actuating mechanism associated therewith. Means are provided for supporting film within the housing behind the lens whereby operation of the shutter will provide for exposure of the film for taking a still picture.

The camera of this invention is specifically designed for use in conjunction with film provided in a relatively long length whereby a plurality of pictures can be taken through the use of respective frames of the film. Perforations are provided along the length of the film, and these perforations are spaced at intervals corresponding to the frame intervals. Accordingly, the camera design of this invention corresponds with the aforementioned Harvey camera design in that a sensing member is provided for engagement with the perforations.

It will be understood that the particular film employed in the camera of this invention need not be of the specific type disclosed in the aforementioned Nerwin patent. Thus, the concepts of this invention can be applied to any type of film which is provided with perforations at intervals whereby the sensing member of the camera will operate in the manner to be described.

The improvements which characterize the camera of this invention relate to the ability of the sensing member to respond to engagement with a perforation to achieve a certain specific result. One aspect of this invention relates to the locking function which is achieved by the sensing member whereby the advancing means for the film is locked in a unique manner because of the engagement. A further aspect of this invention relates to the ability of the construction to provide for latching of the means employed for actuating the shutter. This latching is dependent upon the condition of the sensing member and, accordingly, the camera operates in a manner such that the shutter cannot be actuated unless the film is in a proper position.

In the preferred form of this invention, the sensing member performs the dual function of locking the film advancing mechanisms while at the same time providing for latching of the shutter actuating mechanisms. Thus, the locking of the film advancing means takes place when the film has reached a desired position for taking a picture. When a picture has been taken, the construction operates whereby the film advancing means is automatically unlocked while the shutter actuating mechanism is immediately latched. Thus shutter actuating mechanism will remain latched until the next perforation is reached whereby the mechanism will be automatically unlatched while the film advancing means will be unlocked.

The camera construction 10 illustrated in FIGURES 1, 2 and 3 includes a housing 12. A removable back 14 is removably attached to the housing, and a film cartridge 16 shown in FIGURE 4 is adapted to be enclosed within the housing.

The film cartridge 16 includes a spool 18 at one end, and a supply of film is adapted to be inserted within this spool. The film extends across the cartridge to the spool portion 20. This spool portion encloses a rotatable reel to which the leading end of the film is adapted to be attached.

The cartridge also defines an opening 22 which exposes a portion of the film. A slot 24 is defined by the cartridge above the opening 22, and this slot exposes the upper edge 26 of the film. Perforations 28 are defined by the film along this upper edge whereby the cartridge slot also exposes these perforations.

The camera includes a lens member 30, and the opening 22 of the cartridge is located in alignment with this lens when the cartridge is disposed within the camera. A shutter mechanism shown in FIGURE 7 is disposed behind the lens aperture 32. The particular shutter mechanism illustrated is disclosed in detail in copending application Ser. No. 371,726, filed June 1, 1964, and entitled "Flash Camera Shutter." A shutter actuating member 34 is exposed at the top of the camera, and this member is adapted to be pushed downwardly in opposition to the spring 36. Downward movement of the member 34 operates to pivot the arm 38 about the point 40 whereby the arm 42 is adapted to move the shutter plate 44. As noted in the aforementioned copending application, this action will provide for exposing of film disposed within the camera housing.

The film in the cartridge is adapted to be moved within the camera through the use of an advancing knob 46. The lower end of this knob carries a member 48 which is adapted to engage the roll within the cartridge whereby rotation of the knob will provide for movement of the film.

The structure of this invention will be described by referring to a cycle of operation. The initial stage of this cycle is illustrated in FIGURE 6 wherein the film has been moved to a position such that a perforation 28 in the film has engaged a sensing finger 50 which is mounted within the housing. This sensing finger is pivotally attached at the point 52 to an arm 54. A spring 56 has one end attached to the finger 50 while the other end is secured to a stationary fixture within the housing. Accordingly, the spring 56 normally urges the finger to the position shown in FIGURE 6.

Attached to the shaft 58 of the advancing knob 46 is a ratchet wheel 60. A ratchet engaging pawl 62 is pivotally mounted on a stationary axis 64. This pawl carries a bent-over portion 66 which extends into the path of movement of the finger 50.

A latching element 68 is attached to the pivotally mounted arm 54. This latching element is pivotal relative to the arm 54 about the point 70. A spring 72 has one end attached to an extension 74 of the latching element with the other end being attached to the arm 54. The spring normally urges the extension 76 of the latching member toward the shutter actuating member 34. This shutter actuating member defines an opening 78 which is adapted to receive the extension 76 to provide for latching of the shutter actuating mechanism.

When the elements are in the position shown in FIGURE 6, the pawl 62 is out of contact with the ratchet 60, and the latching member 68 is out of contact with the shutter actuating member 34. FIGURE 8 illustrates the condition of these elements when the film advancing knob is turned a small additional amount. This additional turning drags the sensing finger 50 to the position shown in FIGURE 8 whereby the side of the sensing finger engages the portion 66 of the pawl 62. This forces the pawl into engagement with the ratchet teeth to thereby lock the advancing knob against further movement.

When considering FIGURE 8, it will be noted that the latching member 68 is in the same position as in FIGURE 6 whereby the shutter actuating member 34 can be operated to take a picture. When this member 34 is pushed downwardly to take the picture, a cam 88 on the member bears against the extension 82 which is formed in the arm 54. This causes the arm 54 to pivot in a counterclockwise direction whereby the finger 50 is pulled out of the perforation 28. When the finger is pulled out, the spring 56 moves the finger in a clockwise direction whereby the pawl 62 disengages with respect to the ratchet 60.

The finger 50 is now moved to a position which causes it to bear against the film to thereby hold the arm 54 in the position shown in FIGURE 9. With the arm in this position, the latch element 68 tends to bear against the shutter actuating member 34. Accordingly, when this member resumes its normal position after a picture has been taken, the extension 76 will enter into the opening 78 to latch the member 34.

With the advancing knob 46 freed in this manner, the film can be advanced until the finger engages the next perforation at which time the latch element 68 will unlatch with respect to the member 34, and the pawl 62 will engage the ratchet 60. It will, therefore, be appreciated that the operation described provides for a completely automatic operation with respect to locking and unlocking of the advancing knob and latching and unlatching of the shutter actuating mechanism. The operator of the camera cannot take a picture unless the film is in the proper position. Furthermore, there is no danger of a double exposure since the shutter will not operate after a picture is taken unless the film is advanced.

It will be understood that various changes and modifications may be made in the above described mechanism which provide the characteristics of this invention without departing from the spirit thereof particularly as defined in the following claims.

That which is claimed is:

1. In a camera construction including a housing, a lens and shutter associated with the housing, a shutter actuating mechanism, means for supporting film within the housing behind the lens and shutter, the length of said film defining a pluraliy of frames, perforations defined along the length of the film, a sensing member mounted on said housing and adapted to move into engagement with said perforations, and advancing means for effecting indexing of said film past said lens and shutter, engagement of a perforation by said sensing member indicating the proper amount of movement necessary for indexing said film frame by frame, locking means for engaging said advancing means, said locking means including a first portion attached to said advancing means and a second portion operatively connected to said sensing member, said sensing member comprising a pivotally mounted finger, said first portion of said locking means comprising a ratchet tied to said advancing member, and said second portion of said locking means comprising a movable pawl, engagement of said finger with a perforation and continued movement of said advancing means resulting in movement of said finger into engagement with said pawl whereby said pawl is thereby moved into locking engagement with said ratchet, the improvement comprising a movable arm, said finger being connected to said movable arm, means interconnecting said movable arm and said shutter actuating mechanism whereby movement of said shutter actuating mechanism pushes said arm to move said finger out of engagement with a perforation, and means normally urging said finger away from said pawl whereby operation of said shutter actuating mechanism causes said pawl to move out of engagement with said ratchet to release said advancing means.

2. In a camera construction including a housing, a lens and shutter associated with the housing, a shutter actuating mechanism, means for supporting film within the housing behind the lens and shutter, the length of said film defining a plurality of frames, perforations defined along the length of the film, a sensing member mounted on said housing and adapted to move into engagement with said perforations, and advancing means for effecting indexing of said film past said lens and shutter, engagement of a perforation by said sensing member indicating the proper amount of movement necessary for indexing said film frame by frame, the improvement comprising latching means for releasably latching said shutter actuating mechanism, an arm for carrying said latching means, said arm being movably mounted within the construction and one end of said sensing member being connected to said arm, a diving member accessible from the exterior of said camera housing and engaging said shutter actuating mechanism, said driving member having a camming surface which, when activated to engage said shutter actuating mechanism, contacts a member attached to said arm, thereby pushing said arm resulting in movement of the arm to effect movement of said latching mechanism to a latching position and movement of said sensing member out of engagement with a perforation.

3. A construction in accordance with claim 2 wherein said sensing member comprises a movable finger, engagement of said finger with a perforation resulting in movement of the finger from a first position to a second position, means normally urging said finger to said first position, and wherein movement of said arm by said driving member moves said finger out of engagement with a perforation whereby the finger is urged to its first position so that return movement of said driving member will not permit said finger to re-enter a perforation.

4. A construction in accordance with claim 2 including a ratchet associated with said film advancing means, and a pawl for engaging said ratchet, engagement of said sensing member with a perforation operating to move said pawl into engagement with said ratchet for thereby locking the ratchet and the associated advancing member.

5. A construction in accordance with claim 2 wherein said arm is pivotally connected to said housing at one end and wherein said latching means is pivotally attached to the other end of said arm, and including means for resiliently urging said latching means into engagement with said shutter actuating member when said finger bears against said film.

References Cited
UNITED STATES PATENTS

| | | | |
|---|---|---|---|
| 3,148,605 | 9/1964 | Peterson et al. | 95—31 |
| 3,232,196 | 2/1966 | Sapp, et al. | 95—31 |
| 3,237,542 | 3/1966 | Ataka | 95—31 |

NORTON ANSHER, *Primary Examiner.*

ROBERT A. SCHROEDER, *Assistant Examiner.*